(12) United States Patent
Iida

(10) Patent No.: US 8,031,790 B2
(45) Date of Patent: Oct. 4, 2011

(54) WIRELESS COMMUNICATION DEVICE

(75) Inventor: Sachio Iida, Chiba (JP)

(73) Assignee: Sony Corporation, Tokyo (JP)

( * ) Notice: Subject to any disclaimer, the term of this patent is extended or adjusted under 35 U.S.C. 154(b) by 87 days.

(21) Appl. No.: 12/409,059

(22) Filed: Mar. 23, 2009

(65) Prior Publication Data

US 2009/0232246 A1    Sep. 17, 2009

Related U.S. Application Data

(62) Division of application No. 10/580,823, filed as application No. PCT/JP2005/019034 on Oct. 17, 2005, now Pat. No. 7,751,487.

(30) Foreign Application Priority Data

Oct. 25, 2004    (JP) ................. 2004-309148

(51) Int. Cl.
*H04K 1/10*   (2006.01)
(52) U.S. Cl. ........ 375/260; 375/261; 375/300; 375/298; 375/299; 375/297; 375/347; 375/349
(58) Field of Classification Search .......... 375/260, 375/261, 300, 298, 267, 299, 297, 347, 349
See application file for complete search history.

(56) References Cited

U.S. PATENT DOCUMENTS

| | | | | |
|---|---|---|---|---|
| 6,091,932 | A * | 7/2000 | Langlais | 725/111 |
| 7,505,522 | B1 * | 3/2009 | Larsson | 375/260 |
| 2004/0047285 | A1 | 3/2004 | Foerster et al. | |
| 2005/0265220 | A1 * | 12/2005 | Erlich et al. | 370/208 |

FOREIGN PATENT DOCUMENTS

| | | |
|---|---|---|
| JP | 7-312552 | 11/1995 |
| JP | 9-93216 | 4/1997 |
| JP | 2002-84254 | 3/2002 |
| JP | 2003-60525 | 2/2003 |
| JP | 2003-60525 A | 2/2003 |
| JP | 2003-78391 | 3/2003 |
| JP | 2003-78391 A | 3/2003 |
| JP | 2003-101603 | 4/2003 |
| JP | 2004-173153 | 6/2004 |
| JP | 2004-173153 A | 6/2004 |
| JP | 2005-151062 | 6/2005 |

OTHER PUBLICATIONS

Batra, Anuj et al., "Multi-band OFDM Physical Layer Proposal", IEEE 802.15-03/267r1, pp. 1-27, 2003.
Crols, Jan et al., "Low-IF Topologies for High-Performance Analog Front Ends of Fully Integrated Receivers", IEEE Transactions on Circuits and Systems-II Analog and Digital Signal Processing, vol. 45, No. 3, pp. 269-282, 1998.

(Continued)

*Primary Examiner* — Kabir A Timory
(74) *Attorney, Agent, or Firm* — Oblon, Spivak, McClelland, Maier & Neustadt, L.L.P.

(57) ABSTRACT

A multiband OFDM_UWB transmitting and receiving apparatus is provided in Low-IF configuration to solve problems attributed to a direct-conversion transmitting and receiving apparatus. A Low-IF receiver performs sorting by rotating a sub-carrier after FFT to eliminate the need for frequency conversion using a second local signal and uses the same AD conversion clock as that for a direct conversion receiver. An FFT-free preamble can be detected by using a sequence resulting from previously multiplying an original preamble pattern and an IF frequency together.

8 Claims, 16 Drawing Sheets

OTHER PUBLICATIONS

Anuj Batra, et al., "Design of a Multiband OFDM System for Realistic UWB Channel Environments", IEEE Transactions on Microwave Theory and Techniques, vol. 52, No. 9, XP001201823, Sep. 1, 2004, pp. 2123-2138.

Anuj Batra, "Multi-band OFDM Physical Layer Proposal", IEEE 802.15-03/267r1, Jul. 2003, pp. 1, 7-13, 17, 46, 47.

* cited by examiner

5TH ORDER HILBERT BPF $C_n = Ref_n * Gm/W_c$
$GmC_n = Ref_n * Gm * W_o / W_c$

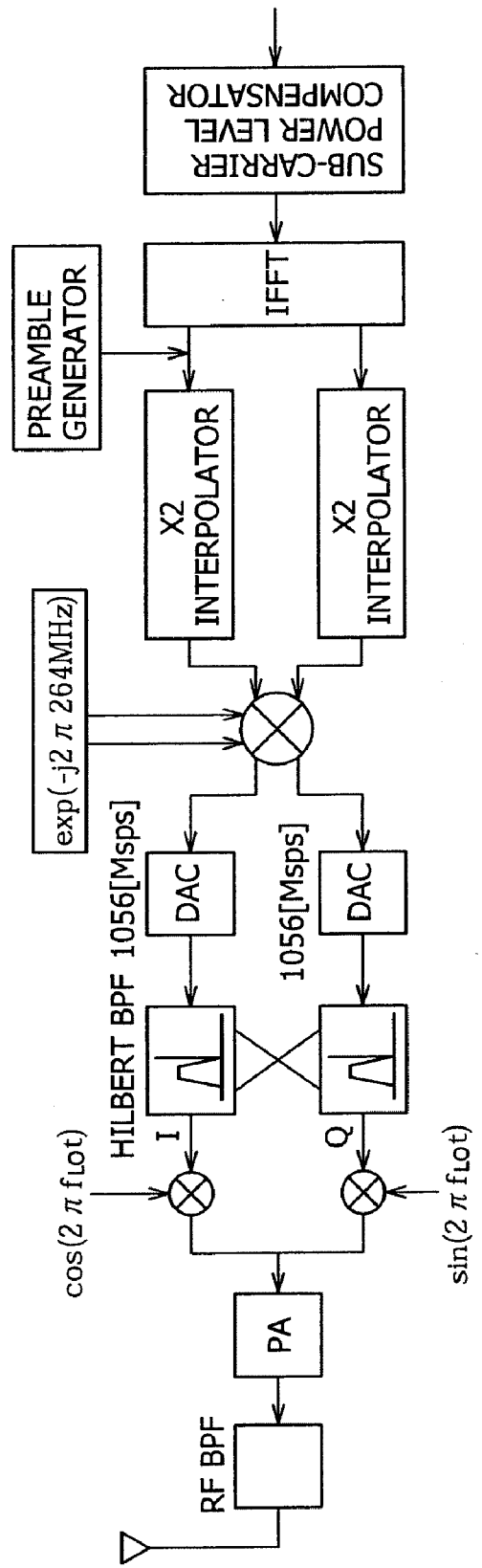
F I G. 8

COMPLEX X2 INTERPOLATOR

F I G . 2 5
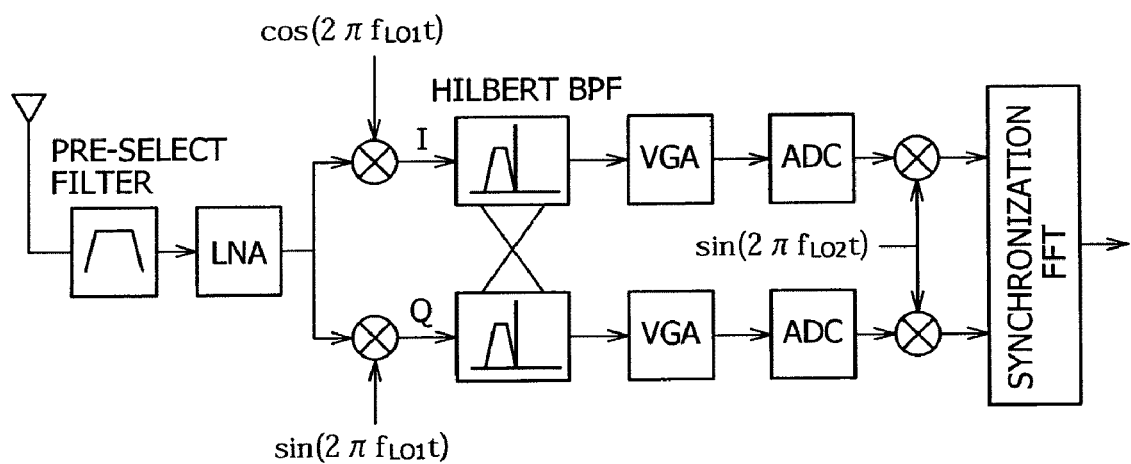

WIRELESS COMMUNICATION DEVICE

CROSS REFERENCE TO RELATED APPLICATIONS

This application is a divisional application of U.S. application Ser. No. 10/580,823 filed May 26, 2006, the entire contents of which are incorporated herein by reference, which is based upon and claims the benefit of priority from the prior Japanese Patent Application No. 2004-309148 filed on Oct. 25, 2004.

TECHNICAL FIELD

The present invention relates to a radio communication apparatus for transmitting and receiving multiband radio signals and more particularly to a radio communication apparatus for transmitting and receiving multiband OFDM signals whose center frequency hops at a specified band interval.

In more detail, the present invention relates to a radio communication apparatus according to the OFDM_UWB communication system for changing frequencies in a broad band and more particularly to a radio communication apparatus according to the OFDM_UWB communication system based on the Low-Intermediate Frequency (Low-IF) architecture.

BACKGROUND ART

A special attention is paid to the radio LAN that frees users from the wired LAN architecture. The radio LAN can eliminate most cables in working spaces such as offices, making it possible to relatively easily move communication terminals such as personal computers (PCs). In recent years, there is an increasing demand for wireless LAN systems in accordance with their increased processing speeds and reduced prices. Today, especially, introduction of a personal area network (PAN) is taken into consideration for the sake of information communication by constituting a small-scale wireless network between a plurality of electronic devices around a person. For example, there are provided different wireless communication systems using frequency bands such as 2.4 GHz and 5 GHz bands that need not be licensed by governing legal authorities.

The radio network performance is dramatically increased while the integration and energy saving are improved for LSI technologies. Radio networks are used worldwide and are being standardized. Prices of radio LAN apparatuses have been reduced approximately as low as computer peripherals. The use of radio networks is not limited to conventional computer networks, but is diversely intended for connection with peripherals in an office, transmission of high-quality video such as streams between home information appliances in a house, and the like.

Typical standards concerning radio networks include IEEE (The Institute of Electrical and Electronics Engineers) 802.11 (e.g., see non-patent document 1), HiperLAN/2 (e.g., see non-patent document 2 or 3), IEEE802.15.3, and Bluetooth communication. The IEEE802.11 standard is further classified into various radio communication systems such as IEEE802.11a, IEEE802.11b, and the like depending on radio communication systems and frequency bands to be used.

In recent years, special attention is paid to the "Ultra-Wideband (UWB) communication," i.e., as a radio communication system to realize the short-range ultra-fast transmission and is expected to be in practical use (e.g., see non-patent document 4). The UWB communication performs radio communication by using ultra-short pulse shorter than one nanosecond to carry information without using carriers in a very wide frequency band. Presently, for example, IEEE802.15.3 is under examination of the system for transmitting packet-structured data containing preambles as an access control system for the ultra-wideband communication.

In the future, WPAN (Wireless Personal Access Network) such as UWB for short-range communication is supposed to be incorporated into all home appliances and CE (Consumer Electronics) devices. It is expected to realize P-to-P transmission between CE devices or home networks at speeds over 100 Mbps. When millimeter wave bands are widely used, it is possible to provide short-range radio communications at speeds over 1 Gbps. It is also possible to realize ultra-fast short-range DAN (Device Area Network) including storage devices and the like.

When radio networks are constructed under a working environment where there is a mixture of many devices in a room, multiple networks may be constructed to overlap with each other. The radio network using one channel has no corrective measures when another system interrupts the communication or an interference degrades the communication quality.

To solve this problem, the multi-channel communication system is used to previously provide multiple communication channels. An interference may degrade the communication quality when another system interrupts the communication or the number of participating stations increases to leave no allowance in the band. In such case, it is possible to select a communication channel to start operations, maintain network operations, and realize coexistence with the other networks.

For example, the multi-channel communication system is also used in the high-speed radio PAN system in compliance with IEEE802.15.3. That is, there are provided multiple frequency channels available for the system. According to the algorithm used, a radio communication device, when turned on, scans for all available channels. The radio communication device becomes a piconet coordinator (PNC) and confirms whether or not there is a device transmitting a beacon signal in the vicinity. The radio communication device selects a frequency channel to be used.

Constructing a radio network in a room forms the multipath environment where a receiver receives a layer of a direct wave and multiple reflected and delayed waves. The multipath environment generates a delay distortion (or frequency selective fading) to cause a communication error. Further, an inter-symbol interference results from the delay distortion.

Major countermeasures against the delay distortion may include the multi-carrier transmission system. The multi-carrier transmission system transmits transmission data by distributing it to multiple carriers having different frequencies. Each carrier is provided with a narrow band, making it difficult to be subject to effects of the frequency selective fading.

For example, the OFDM (Orthogonal Frequency Division Multiplexing) system, one of multi-carrier transmission systems, configures a frequency of each carrier so that the carriers become orthogonal to each other in a symbol region. During information transmission, the system converts serially transmitted information into parallel information at a symbol frequency lower than the information transmission rate. The system allocates a plurality of pieces of output data to each carrier, modulates the amplitude and the phase for each carrier, and performs the inverse FFT for the carriers. In this manner, the system converts the carriers into signals along the time axis by maintaining the orthogonality of each carrier along the frequency axis. The reception occurs in the reverse order of the transmission. The system performs the FFT to convert signals along the time axis into those along the frequency axis and demodulates the carriers in accordance with the modulation of each carrier. The system performs parallel-serial conversion to reproduce the information that was originally transmitted in the serial signals.

The OFDM modulation system is adopted as a wireless LAN standard in the IEEE802.11a/g, for example. The IEEE802.15.3 standardization is also in progress for the UWB communication system using the OFDM modulation system in addition to the DS-UWB system and the impulse-UWB system. The DS-UWB system increases spread speeds of DS information signals to the utmost limit. The impulse-UWB system uses impulse signal sequences having very short frequencies of several hundred picoseconds to configure information signals for transmission and reception. With respect to OFDM_UWB communication systems, the multiband OFDM_UWB communication system is under discussion (e.g., see non-patent document 5). The multiband OFDM_UWB communication system is an OFDM modulation system that performs frequency hopping (FH) for frequency bands ranging from 3.1 to 4.8 GHz into multiple frequency channels (sub-bands) each composed of 528 MHz bandwidths and uses IFFT/FFT with each frequency band composed of 128 points.

FIG. 17 shows a frequency allocation defined in the multiband OFDM_UWB communication system. The frequencies are composed of groups 1, 2, 3, D, and 5. Group 1 is composed of bands #1 through #3 whose center frequencies are 3432 MHz, 3960 MHz, and 4488 MHz, respectively. Group 2 is composed of bands #4 through #6 whose center frequencies are 5016 MHz, 5544 MHz, and 6072 MHz, respectively. Group 3 is composed of bands #7 through #9 whose center frequencies are 6600 MHz, 7128 MHz, and 7656 MHz, respectively. Group D is composed of bands #10 through #12 whose center frequencies are 8184 MHz, 8712 MHz, and 9240 MHz, respectively. Group 5 is composed of bands #13 and #14 whose center frequencies are 9768 MHz and 10296 MHz, respectively. It is mandatory to use three bands in group 1. The other groups and bands are reserved for the future expansion.

FIG. 18 shows an configuration example of the receiver used for the multiband OFDM system (e.g., see non-patent document 6). The receiver in FIG. 18 is configured for direct conversion. The direct conversion system removes an intermediate frequency (IF) stage. A low-noise amplifier (LNA) amplifies a signal received at an antenna. A mixer then multiplies the signal by a local frequency to directly apply the frequency conversion to a baseband signal. The example in FIG. 18 uses local (LO) signals $\cos(2\pi f_c)$ and $\sin(2\pi f_c)$ for frequency conversion of reception signals corresponding to the I and Q axes, respectively. After the frequency conversion, a low-pass filter (LPF) extracts low frequencies. A VGA (Variable Gain Amplifier) amplifies the signal. The AD conversion is performed. Further, the FFT is performed to transform time-axis signals to frequency-axis signals. Each carrier is demodulated to reproduce the information transmitted by the original carrier signal.

When using the group-1 band as shown in FIG. 17, for example, the direct conversion receiver as shown in FIG. 18 requires local signals having three frequencies 3432 MHz, 3960 MHz, and 4488 MHz that are the same as the RF signal's center frequencies.

The direct conversion system eliminates the use of an IF filter, easily broadens the receiver's band, and increases flexibility of the receiver configuration. However, the direct conversion system equalizes the reception frequency with the local frequency. There is a known problem that the local signal's self mixing (LO self mixing) causes a DC component, i.e., a DC offset (e.g., see non-patent document 7).

FIG. 19 shows how the local signal's self mixing occurs. The local signal leaks from the receiver body to the antenna. This signal partially reflects at the antenna and returns to the receiver. The mixer multiplies the signal and the local signal itself together. In another possible case, the local signal is partially radiated to the outside through the antenna. Subsequently, a reflected wave may be received at the antenna and is mixed with the local signal.

In FIG. 19, for example, let us assume that the local signal's amplitude is 0.5 V; the low-noise amplifier (LNA) and the mixer provide a total gain of 30 dB; and a leaking local signal reflects at the antenna and returns to point A in FIG. 19 to attenuate −70 dB. Under this condition, the DC offset for mixer output is found to be 2.5 mV. Since the expected wave's signal level is approximately −74 dBm at the minimum, the mixer output becomes −44 dBm=1.4 mVrms. It can be understood that the DC offset becomes greater than the expected wave's signal level.

The following equation describes a process to generate the DC offset. In the equation, $\cos(\omega t)$ represents the local signal and $\alpha$ and $\phi$ respectively represent the amplitude and the phase of a reflected wave returned to the mixer. In the equation, the first term of the right side represents the DC offset. The second and third terms represent double frequency components. It will be understood that the DC offset varies with the reflected wave's amplitude and phase.

$$\alpha \cdot \cos(\omega \cdot t + \phi) \cdot \cos(\omega \cdot t) = \qquad \text{[Equation 1]}$$
$$\frac{1}{2} \cdot \alpha \cdot (\cos(\phi) + \cos(\phi) \cdot \cos(2 \cdot \omega \cdot t) - \sin(\phi) \cdot \sin(2 \cdot \omega \cdot t))$$

Since the multiband OFDM system performs the frequency hopping (FH), the local signal frequency varies with each frequency hopping. Since the antenna's reflection coefficient depends on frequencies, the DC offset resulting from self-mixing varies with the frequency hopping. The frequency hopping occurs as frequently as 3.2 MHz equal to the OFDM symbol rate. As shown in FIG. 20, the DC offset stepwise varies at the frequency of 1/3.2 MHz=312.5 nanoseconds.

Generally, the DC offset is removed by serially inserting a capacitor in the mixer output. In this case, capacitor C and circuit impedance R construct a first-order high-pass filter (HPF). The cutoff frequency for frequency response becomes $1/(2\pi CR)$. The convergence time for step response becomes $2\pi CR$.

Since the multiband OFDM system uses the sub-carrier frequency of 4.125 MHz, the direct conversion receiver is requested to pass up to 4.125 MHz. With respect to the DC offset, the convergence time for step response needs to be limited to approximately 1/10 of the OFDM symbol rate (approximately 30 nanoseconds). When the cutoff frequency is set to 4.125 MHz, the time to converge the step response becomes as large as 242 nanoseconds (=1/4.125 MHz) as shown in FIG. 22. The problem is that the most time within the OFDM symbol is accompanied by the step response.

Generally, available means of changing frequencies is to multiply the same oscillatory frequency using PLL (Phase Lock Loop). However, there is the problem that the multiband OFDM_UWB system is subject to a large difference in the channel changeover as shown in FIG. 17. The single PLL cannot change frequencies within such wide band. A high-precision multiband generator can be constructed by providing multiple oscillators and generating corresponding frequency bands. However, there may be problems concerning the circuit's planar dimension and power consumption, a frequency phase difference for each oscillator, and the like.

To solve this problem, multiband generation is performed by repeatedly dividing the single frequency output from the oscillator and mixing divided output frequencies (i.e., outputting a sum or a difference between frequencies).

FIG. 23 diagramatically shows a conventional example of the frequency synthesis block (group-1 3-band mode) for frequency hopping (FH) used for the direct conversion receiver as shown in FIG. 18 of the multiband OFDM system. As shown in FIG. 23, the divider and the mixer can be used to mix (add or subtract frequencies) the center frequency of each band with the reference frequency obtained from the single oscillator (e.g., TCXO (Temperature Compensated Crystal Oscillator)).

The example in FIG. 23 uses the reference frequency of 4224 MHz obtained by multiplying the oscillatory frequency output from the oscillator according to PLL (Phase Lock Loop). The reference frequency is divided by 4 to extract the frequency of 1056 MHz. This is divided by 2 to extract the frequency of 528 MHz that is used for a sample clock. The 528 MHz sample clock is further divided by 2 to extract the frequency of 264 MHz that is a band interval of center frequencies for frequency hopping.

Each mixer marked with SSB (Single Side Band) performs mixing, i.e., adding or subtracting frequencies of the obtained signals as mentioned above. The mixer adds frequencies of 528 MHz and 264 MHz to yield the frequency of 794 MHz. A selector (Select) selects 264 MHz or 794 MHz. The subsequent SSB can provide four combinations of frequencies by performing addition or subtraction between the selected output frequency 264 MHz or 794 MHz and the original 4224 MHz frequency signal.

It should be noted that group 1 uses only three frequencies 3432 MHz, 3960 MHz, and 4488 MHz. That is, the 792 MHz frequency is subtracted from 4224 MHz to generate 3422 MHz. The 264 MHz frequency is subtracted from 4224 MHz to generate 3960 MHz. The 264 MHz frequency is added to 4224 MHz to generate 4488 MHz.

In FIG. 23, the device marked with SSB mixes, i.e., adds or subtracts frequencies and is equivalent to an image rejection mixer, for example. The image rejection mixer can obtain a single-side-band signal by analog-multiplying a pair of complex signals whose phases are orthogonal to each other. As shown in FIG. 24, each of frequency signals $f_1$ and $f_2$ is provided with orthogonal components. Frequencies can be synthesized by adding or subtracting frequencies using the addition theorem of the trigonometric function. In FIG. 24, frequency signal $f_1$ is set to 4224 MHz and frequency signal $f_2$ is set to 264 MHz or 794 MHz.

However, the conventional frequency synthesis block as shown in FIG. 24 is subject to the following problems.

(1) Since two SSB mixers are needed, the circuit configuration is complicated and the power consumption is large.

(2) Since the 264 MHz frequency signal is a rectangular wave, third harmonics cause a spurious signal of approximately up to −10 dBc in group 1.

Specifically, the preceding SSB for 792 MHz generation is supplied with not only 528 MHz and 264 MHz, but also the third harmonic of 264 MHz, i.e., −792 HMz. The SSB outputs not only 792 MHz as an intended frequency, but also −264 MHz, causing a spurious signal in group 1.

(3) Since the 264 MHz frequency signal is a rectangular wave, fifth harmonics cause a spurious signal of approximately up to −14 dBc in group 1.

[Non-Patent Document 1]
International Standard ISO/IEC 8802-11: 1999(E) ANSI/IEEE Std 802.11, 1999 Edition, Part II: Wireless LAN Medium Access Control (MAC) and Physical Layer (PHY) Specifications

[Non-Patent Document 2]
ETSI Standard ETSI TS101 761-1 V1.3.1 Broadband Radio Access Networks (BRAN); HIPERLAN Type 2; Data Link Control (DLC) Layer; Part1: Basic Data Transport Functions

[Non-Patent Document 3]
ETSI TS 101 761-2 V1.3.1 Broadband Radio Access Networks (BRAN); HIPERLAN Type 2; Data Link Control (DLC) Layer; Part2: Radio Link Control(RLC) sublayer

[Non-Patent Document 4]
"Ultra Wideband—A newborn revolutionary wireless technology." Nikkei Electronics, 11 Mar. 2002, pp. 55-66.

[Non-Patent Document 5]
IEEE802.15.3a TI Document <URL:http://grouper.ieee.org/group/802/15/pub/2003/May03 filename: 03142r2P802-15_TI-CFP-Document.doc>

[Non-Patent Document 6]
Anuj Batra, "03267r1P802-15_TG3a-Multi-band-OFDM-CFP-Presentation.ppt," pp. 17, July 2003.

[Non-Patent Document 7]
Asad A. Abidi, "Direct-Conversion Radio Transceivers for Digital Communications" (IEEE J. Solid-State Circuits, vol. 30, no. 12, pp. 1399-1410, 1995

DISCLOSURE OF THE INVENTION

Problem to be Solved by the Invention

It is an object of the present invention to provide an excellent radio communication apparatus capable of appropriately transmitting and receiving multiband OFDM signals for hopping center frequencies at a specified band interval.

Means for Solving the Problem

The present invention has been made in consideration of the foregoing. According to a first aspect of the present invention, there is provided a radio communication apparatus which uses a low-intermediate frequency to receive a multiband OFDM signal for hopping a center frequency at a specified band interval. The apparatus comprises:

frequency conversion means for converting a high-frequency reception signal into a low-intermediate frequency signal;

AD conversion means for converting a low-intermediate frequency signal into a digital signal using a specified sampling frequency; and OFDM demodulation means for converting an AD-converted OFDM signal on a time axis into a sub-carrier along a frequency axis so as to perform fast spectrum analysis, wherein the OFDM demodulation means sorts a sequence of sub-carriers changed due to frequency folding caused by a sampling frequency during AD conversion after performing the conversion so as to perform fast spectrum analysis. Any of fast Fourier transform (FFT), wavelet transform, and Hartley transform can be used as the conversion so as to perform fast spectrum analysis for OFDM signals.

Conventionally, the direct conversion system is used for a receiver that receives multiband OFDM signals for hopping center frequencies at a specified band interval. However, the direct conversion system equalizes a reception frequency with a local frequency. Consequently, self-mixing of a local signal causes a DC offset. Since the multiband OFDM system performs frequency hopping, a local signal frequency varies with each frequency hopping. Since an antenna's reflection coefficient depends on frequencies, the DC offset resulting from self-mixing also varies with the frequency hopping.

A Low-IF system receiver is known as means to solve the DC offset problem in the direct conversion receiver. In this manner, the Low-IF system converts the reception signal once into the IF frequency. Even when self-mixing of the local signal causes a DC offset, it can be easily separated because the frequencies are apart from each other. The Low-IF receiver causes a new problem. That is, it requires the Hilbert bandpass filter and a second local signal that are unneeded for the direct conversion receiver. Further, sampling an IF signal makes it necessary to increase the sample clock rate of the AD converter.

When receiving a multiband OFDM signal for frequency hopping, the radio communication apparatus according to the present invention performs conversion such as FFT for fast spectrum analysis of OFDM signals, and then sorts sub-carriers by rotation. This eliminates the need for frequency conversion using a second local signal and enables the use of the same AD conversion clock as for the direct conversion receiver.

The frequency conversion means mixes a reception signal with a local signal to generate low-intermediate frequency signal. Specifically, the frequency conversion means mixes a reception signal with a local signal having a local frequency apart from a reception frequency by half of a band interval for frequency hopping to generate a low-intermediate frequency signal composed of a low-intermediate frequency half the band interval.

The AD conversion means samples analog signals using a sampling frequency twice as high as said low-intermediate frequency. In other words, the AD conversion means samples analog signals using a sampling frequency equivalent to a band interval for frequency hopping.

The radio communication apparatus according to the present invention further includes an intermediate frequency filter to remove unnecessary waves in an low-intermediate frequency signal frequency-converted by the frequency conversion means. According to the Low-IF system, the intermediate frequency filter is composed of a Hilbert bandpass filter formed by using a gyrator to connect the same two real filters with each other. When configuring the Hilbert BPF by using a gyrator for connection between the same two real filters, the present invention uses an integer ratio for an element value of the ladder-type prototype filter as a real filter. In this manner, the present invention can simultaneously control the center frequency and the band. The Hilbert BPF can be easily realized.

Generally, the beginning of a reception frame includes a preamble composed of a known sequence. The preamble sequence is designed on the premise that the correlation is detected in the time domain without performing the FFT. In other words, differently from the frame data portion, the preamble sequence is free from sorting by the FFT. Accordingly, it is impossible to detect the correlation between the received preamble sequence and a known preamble sequence. To solve this problem, the invention uses a sequence resulting from multiplying the known preamble sequence by the low-intermediate frequency to ensure the correlation with a reception signal. In this manner, it is possible to detect the preamble.

According to a second aspect of the present invention, there is provided a radio communication apparatus which uses a low-intermediate frequency to transmit a multiband OFDM signal for hopping a center frequency at a specified band interval. The apparatus comprises:

OFDM modulation means for converting each sub-carrier along a frequency axis into an OFDM signal along a time axis by performing conversion reverse to spectrum analysis without changing a baseband;

low-intermediate frequency multiplication means for multiplying a low-intermediate frequency and a transmission signal after being processed by the conversion reverse to spectrum analysis together to generate an OFDM-modulated low-intermediate frequency signal;

DA conversion means for converting a low-intermediate frequency signal into an analog signal using a specified sampling frequency; and frequency conversion means for converting a low-intermediate frequency signal into a high-frequency transmission signal. Any of inverse fast Fourier transform (IFFT), inverse wavelet transform, and inverse Hartley transform can be used as the above-mentioned conversion reverse to spectrum analysis.

The Low-IF multiband OFDM transmitter according to the invention generates a transmission IF signal by multiplying an IF frequency and an OFDM signal together before DA conversion. The transmitter uses sub-carrier power level compensation means to correct an aperture effect of the DA conversion means before converting a transmission signal reversely to spectrum analysis. In this manner, a flat frequency spectrum can be obtained. It is possible to use the same DA conversion clock as for the direct conversion receiver.

According to another correction method, a complex FIR filter can be used after IFFT to correct a frequency response due to the DA converter's aperture effect. In this manner, a flat frequency spectrum can be obtained. It is possible to simultaneously provide the interpolation and the frequency response correction.

Effect of the Invention

The invention can provide an excellent radio communication apparatus capable of appropriately transmitting and receiving multiband OFDM signals for hopping center frequencies at a specified band interval.

According to the invention, a multiband OFDM_UWB transmitting and receiving apparatus is provided in low-intermediate frequency (Low-IF) configuration to be capable of solving problems attributed to a direct-conversion transmitting and receiving apparatus and of facilitating generation of local frequencies.

The invention solves the problems attributed to the Low-IF receiver that requires the Hilbert bandpass filter and the second local signal unneeded for the direct conversion receiver and increases a sampling clock of the AD converter to sample IF signals. The invention can apply the Low-IF system to the multiband OFDM system.

According to the invention, the Low-IF receiver can rotate to sort sub-carriers after FFT, eliminating the need for frequency conversion using the second local signal. In addition, it is possible to use the same AD conversion clock as for the direct conversion receiver. An FFT-free preamble can be detected by using a sequence resulting from previously multiplying an original preamble pattern and an IF frequency together.

The Low-IF receiver uses the Hilbert BPF to remove an image resulting from the frequency conversion. When configuring the Hilbert BPF by using a gyrator for connection between the same two real filters, the invention uses an integer ratio for an element value of the ladder-type prototype filter as a real filter. In this manner, the present invention can easily control the center frequency. The Hilbert BPF can be easily realized.

When a capacitor is serially inserted to an output from the mixer for frequency multiplication so as to remove a DC offset, the invention can limit the step response time to approximately 1/10 of the OFDM symbol time by setting the HPF cutoff frequency to approximately 33 MHz.

The Low-IF multiband OFDM transmitter according to the invention generates a transmission IF signal by multiplying an IF frequency and an OFDM signal together before DA conversion. Correcting the DA converter's aperture effect before IFFT makes it possible to use the same DA conversion clock as for the direct conversion receiver.

Since the invention provides the multiband OFDM_UWB transmitting and receiving apparatus in Low-IF configuration, it is possible to easily generate local frequencies and decrease spurious signals.

These and other objects, features, and advantages of the invention may be readily ascertained by referring to the following embodiments of the invention and appended drawings.

BRIEF DESCRIPTION OF DRAWINGS

FIG. 8 shows the configuration of a Low-IF multiband OFDM_UWB multiband transmitter according to an embodiment of the present invention.

FIG. 25 shows a general configuration example of the Low-IF receiver.

BEST MODE FOR CARRYING OUT THE INVENTION

Embodiments of the present invention will be described in further detail with reference to the accompanying drawings.

A Low-IF system receiver is known as means to solve the DC offset problem in the direct conversion receiver. For example, the Low-IF system is described in "Low-IF Topologies for High-Performance Analog Front Ends of Fully Integrated Receivers" (IEEE Trans. Circuits Syst. II, vol. 45, pp. 269-282, March 1998)" written by J. Crols and M. Steyaert.

FIG. 25 shows the general configuration of the Low-IF receiver. The Low-IF receiver in FIG. 25 converts a reception signal into an intermediate frequency (IF) using first complex local signal frequencies $\cos(2f_{LO1}t)$ and $\sin(2f_{LO1}t)$ different from the reception frequency. During the frequency conversion, an intended signal and an image signal on both sides of local frequency LO1 appear in the IF. The Hilbert band pass filter (BPF) is used as an IF filter to remove image signals. The receiver then amplifies the IF signal, AD-converts it, performs a digital process to convert the frequency using the local signal, and converts the IF signal into a baseband signal.

In this manner, the Low-IF system converts the reception signal once into the IF frequency. Even when self-mixing of the local signal causes a DC offset, it can be easily separated because the frequencies are apart from each other. Since no intended signal is found near the DC, the DC offset does not interfere with the intended signal. Further, the Low-IF system may easily generate local signals because the local signal frequency differs from the reception frequency. This will be discussed in more detail later.

The Low-IF receiver causes a new problem. That is, it requires the Hilbert bandpass filter and a second local signal that are unneeded for the direct conversion receiver.

To AD-convert and remove a DC offset and an image frequency signal unchangedly, it is necessary to AD-convert the DC offset and the image frequency signal as well as the indented signal. In this case, sampling an IF signal makes it necessary to increase the sample clock rate of the AD converter.

The present invention solves these problems of the Low-IF receiver and appropriately applies the Low-IF system to the multiband OFDM system.

In this context, Low-IF (low-intermediate frequency) signifies the use of a low intermediate frequency (IF) equivalent to a half of the band interval in the frequency hopping. The multiband OFDM_UWB system in FIG. 17 uses the IF frequency of 264 MHz that is a half of the band interval (i.e., hopping frequency).

Figure 1:
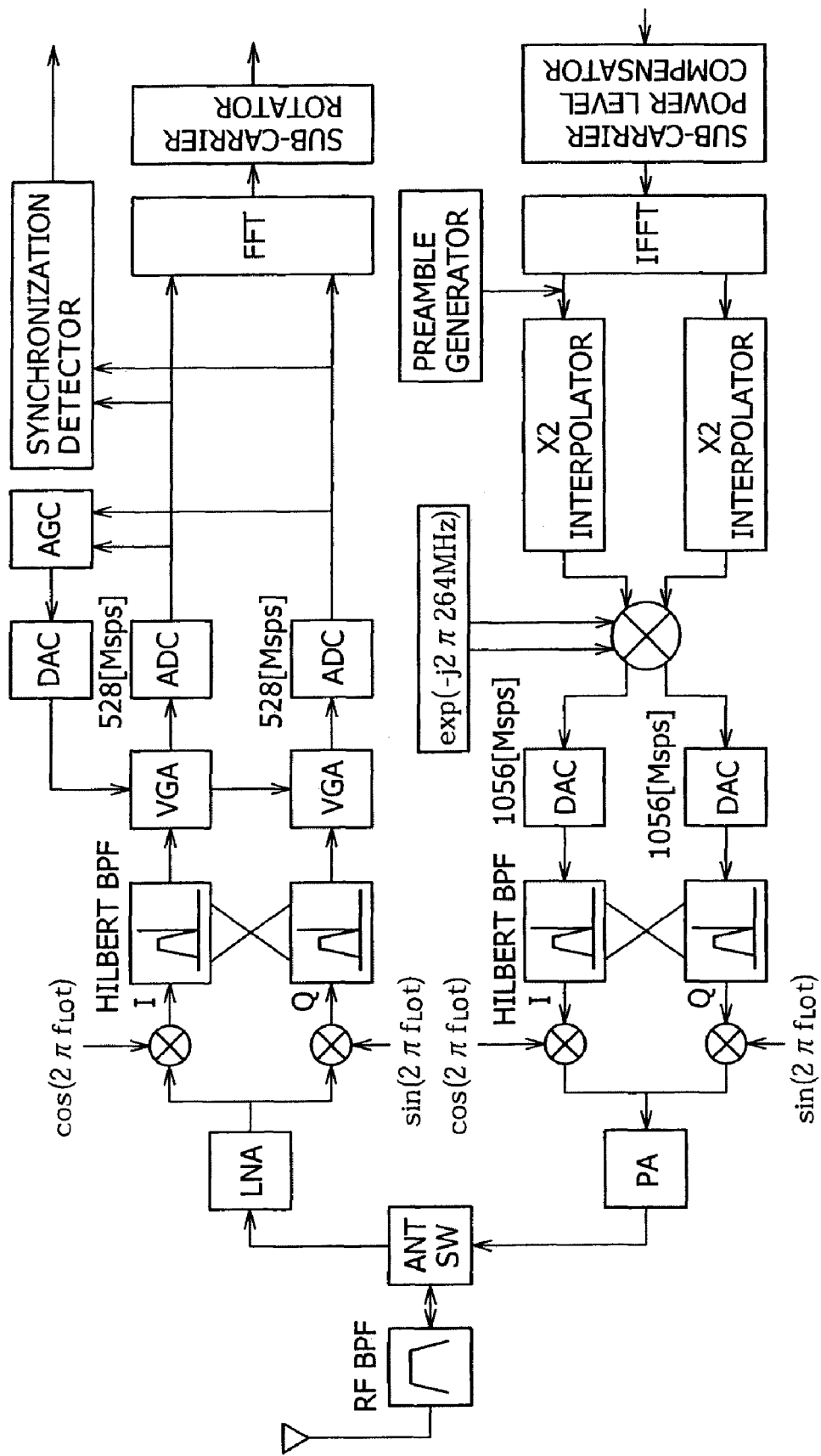
FIG. 1 shows the configuration of a Low-IF multiband OFDM_UWB transmitting and receiving apparatus according to an embodiment of the present invention.

FIG. 1 shows the configuration of a Low-IF multiband OFDM_UWB transmitting and receiving apparatus according to an embodiment of the present invention. In FIG. 1, the top half is equivalent to the receiver. The bottom half is equivalent to the transmitter. Both share one antenna via an antenna switch.

Figure 2:
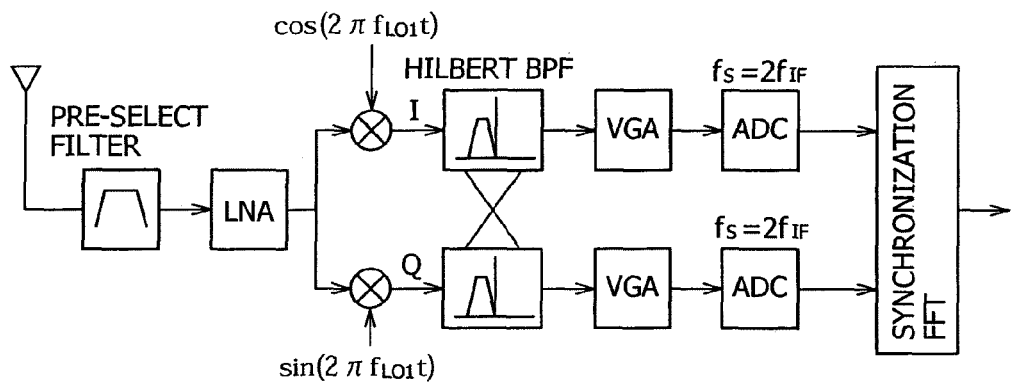
FIG. 2 diagramatically shows only a receiver portion of the Low-IF transmitting and receiving apparatus.

FIG. 2 shows only the receiver of the Low-IF transmitting and receiving apparatus. With reference to FIG. 2, the following describes in detail the Low-IF receiver according to the present invention.

It is assumed that local signal $f_{LO1}$ is 264 MHz higher than the center frequency of the reception signal and that the IF frequency is −264 MHz. The product of the multiband OFDM_UWB system's sub-carrier frequency (4.125 MHz) multiplied by the FFT size (128) is 528 MHz. Accordingly, the baseband bandwidth is ±264 MHz.

To prevent the frequency folding (or AD converter aliasing), the sampling frequency for AD conversion needs to be double the signal frequency. The direct conversion receiver provides the sampling frequency of 528 MHz. By contrast, the Low-IF receiver using the IF frequency of −264 MHz provides the signal frequency range from −528 MHz to 0 MHz and therefore requires the sampling frequency of 1056 MHz. This is a first problem. To solve this problem, the embodiment performs A/D conversion using half the sampling frequency, i.e., 528 MHz (band interval of center frequencies for the frequency hopping and positively uses the frequency folding.

Figure 3A:
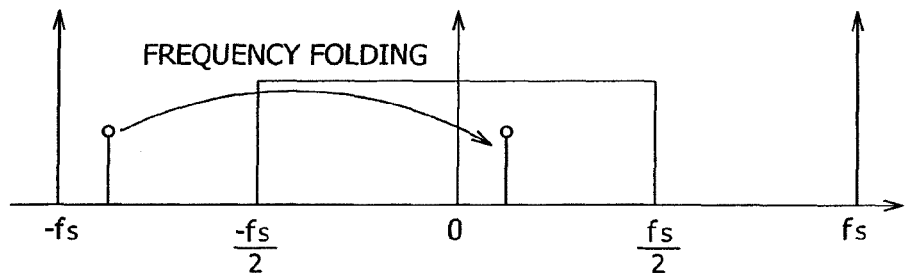
FIG. 3 shows how frequency folding occurs due to AD conversion of OFDM reception signals.
Figure 3B:
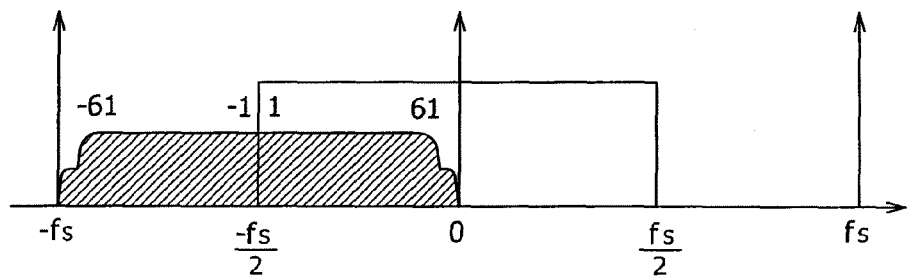
Figure 3C:
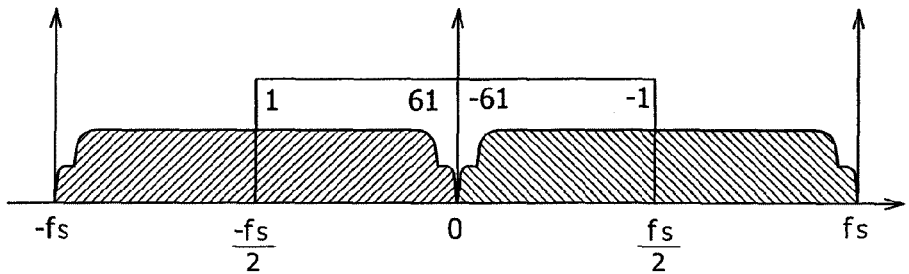

FIG. 3(a) shows the sampling frequency and how the frequency folding occurs. FIG. 3(b) shows the relationship between the OFDM signal and the sampling frequency before A/D conversion. FIG. 3(c) shows the relationship between the OFDM signal and the sampling frequency after A/D conversion. It can be understood from FIG. 3(c) that, after A/D conversion of the OFDM signal, the frequency folding changes the sub-carrier sequence but all the necessary signals are AD-converted.

The OFDM modulation system performs FFT to transform the time signal into the frequency domain for reception. The sub-carriers can be easily sorted after FFT. Since the FFT originally performs a sort operation, no special process is needed (e.g., see AGUI Takeshi and NAKAJIMA Masayuki. "Using FFT." SANPO PUBLICATIONS INCORPORATED, 1981, pp. 76) Sorting sub-carriers is equivalent to performing the frequency conversion. Accordingly, the embodiment differs from the conventional Low-IF receiver as shown in FIG. 25 and eliminates the need for the frequency conversion using a second local signal.

So far, the Low-IF receiver according to the embodiment has demonstrated the successful demodulation of multiband OFDM signals. On the other hand, the multiband OFDM system uses a preamble sequence for packet synchronization. The preamble sequence is designed on the premise that the correlation is detected in the time domain without performing the FFT. In other words, differently from the frame data portion, the preamble sequence is free from sorting by the FFT. Accordingly, it is impossible to detect the correlation between the received preamble sequence and a known preamble sequence. To solve this problem, the embodiment employs the preamble detection method that uses a sequence resulting from previously multiplying the original preamble pattern by the IF frequency to ensure the correlation with a reception signal.

Since the preamble is a real-number signal, the original preamble sequence is multiplied by a repetition of +1 and −1 resulting from sampling cos(−264 MHz) at 528 MHz, where cos(−j264 MHz) is a cosine wave component of IF frequency exp(−j264 MHz). Consequently, the synchronization is obtained by ensuring the correlation between a reception signal and the sequence resulting from multiplying a repetition of +1 and −1 by the preamble sequence intended to be detected.

Figure 4:
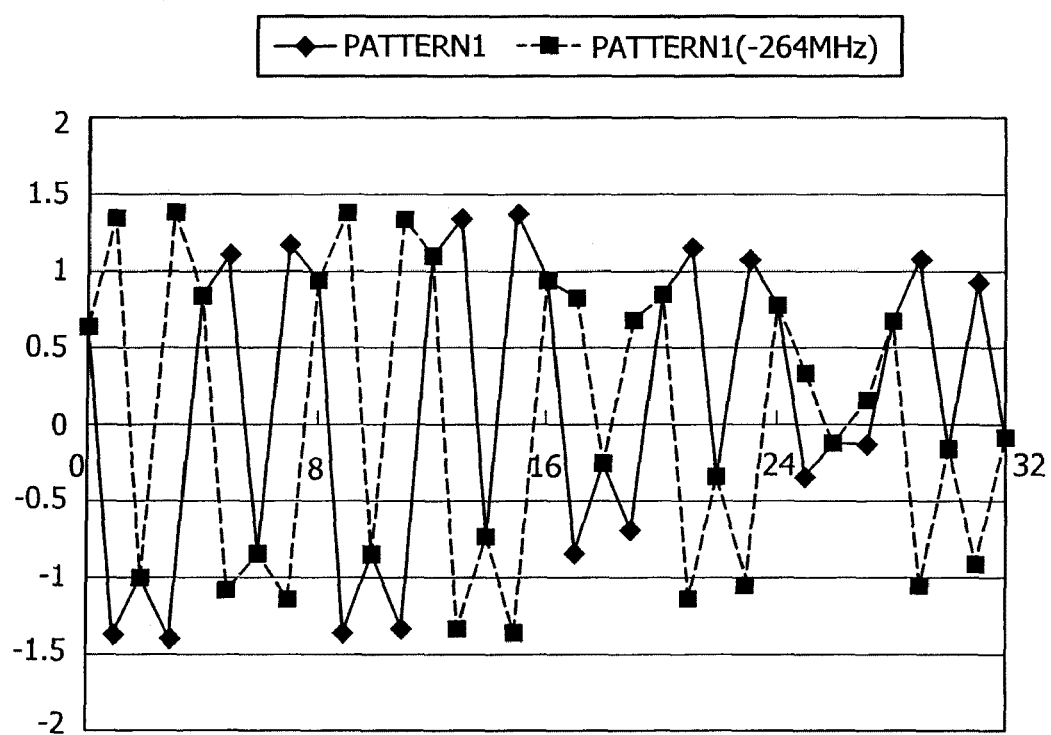
FIG. 4 shows the relationship between an original preamble sequence and a preamble sequence intended to be detected.

FIG. 4 shows the relationship between an original preamble sequence and a preamble sequence intended to be detected. In FIG. 4, pattern 1 is the original preamble sequence. Pattern 1(−264 MHz) is the sequence intended to be detected resulting from multiplying a repetition of +1 and −1.

The Low-IF multiband OFDM receiver requires a Hilbert bandpass filter that is unneeded for the direct conversion system (see above). The reason is to remove image components caused by the frequency conversion from the reception signal. There is a known method of using a gyrator to connect the same two real filters so as to realize a Hilbert BPF (also called a complex filter) having the −264 MHz center frequency and the 528 MHz band (e.g., see J. O. Voorman. "The Gyrator as a Monolithic Circuit in Electronic Systems." Ph. D. thesis, pp. 83-103, University of Nijmengen, 1977).

Figure 5:
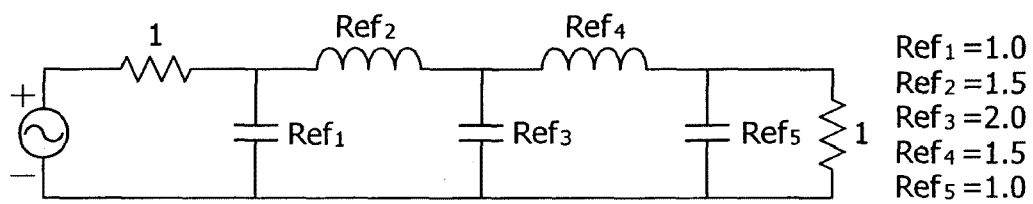
FIG. 5 is the circuit diagram of a prototype LPF.
Figure 6:
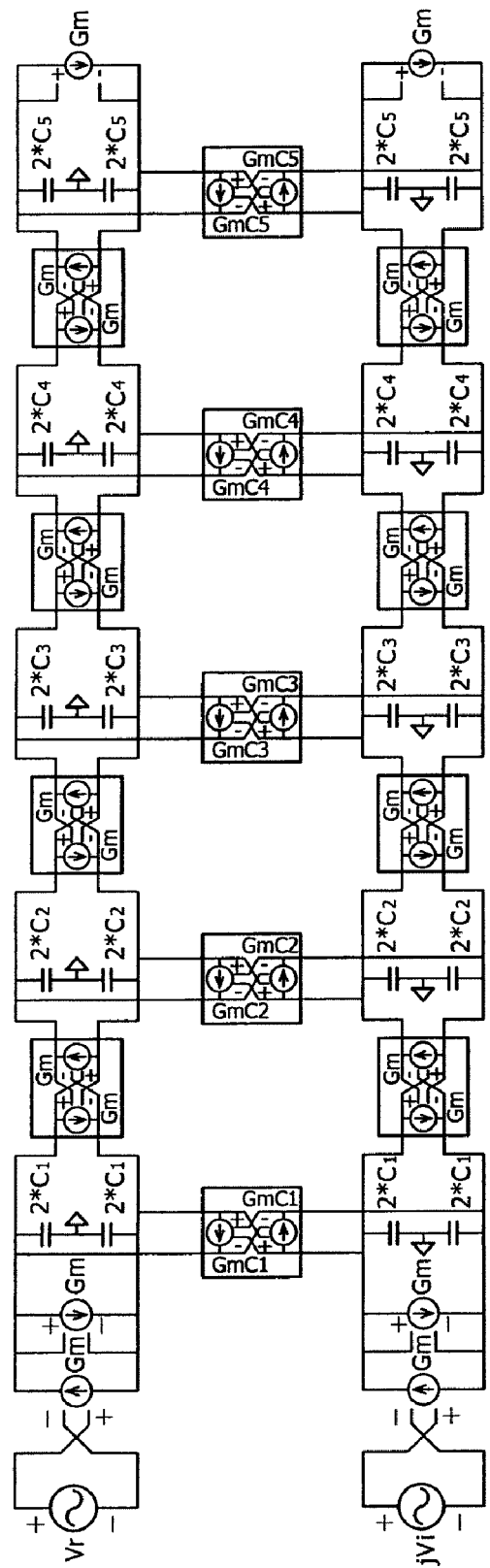
FIG. 6 is the circuit diagram of a Hilbert BPF.

FIG. 5 is a circuit diagram showing a prototype LPF. FIG. 6 is a circuit diagram showing a Hilbert BPF. A critical problem is control over the center frequency. In FIG. 6, each of five gyrators connects the same two real filters with each other. The following equation shows values of transconductance $G_m C_n$ corresponding to the gyrators.

$$G_m C_n = \text{Ref}_n \times G_m \times \omega_o / \omega_c \quad \text{[Equation 2]}$$

In this equation, $\omega_0$ is the center frequency; $\omega_c$ is the half of the band; $\text{Ref}_n$ is the prototype LPF's element value; $G_m$ is the transconductance to determine $\omega_c$; and $G_m C_n$ is the transconductance to determine $\omega_0$. Generally, the transconductance is proportional to the transistor size and the current. When the relationship among $\omega_0$, $\omega_c$, and $\text{Ref}_n$ is selected so as to provide an integer ratio between $G_m C_n$ and $G_m$, an integer ratio can be provided between the transistor size and the current. This makes it possible to easily fabricate the Hilbert BPF as an integrated circuit and simultaneously control the center frequency and the band. Since the embodiment provides the same absolute value for $\omega_0$ and $\omega_C$, the prototype filter is designed so that $\text{Ref}_n$ becomes a simple integer ratio.

Figure 7:
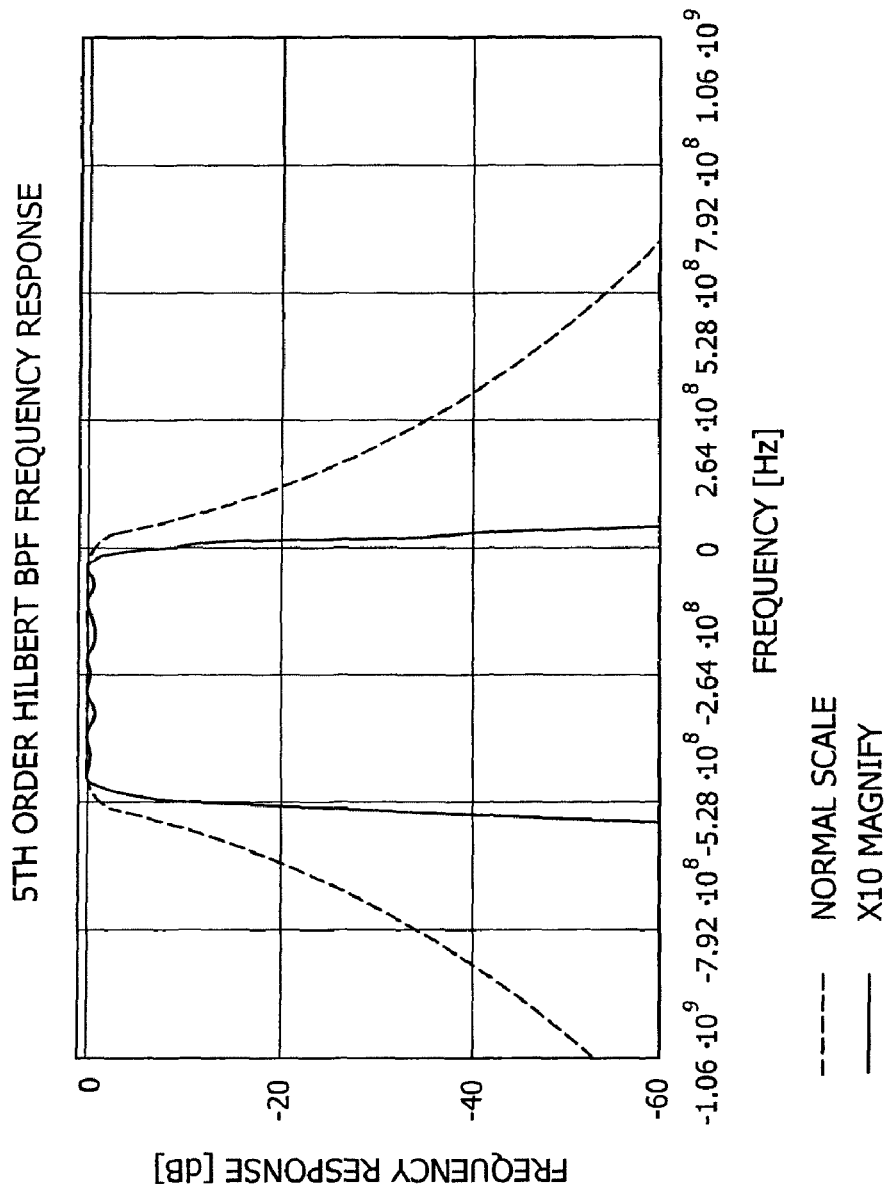
FIG. 7 shows a frequency response of the Hilbert BPF.

FIG. 7 shows a frequency response of the Hilbert BPF according to the embodiment. When a cutoff frequency is aligned to the center frequency, the center frequency and the band can be controlled simultaneously.

The multiband OFDM_UWB system has ±64 sub-carriers, i.e., 128 sub-carriers in total. Of these, the sub-carriers up to the ±56th are used for data transmission. Important baseband frequencies are up to 4.125 MHz×±56=±231 MHz. Since the IF frequency is configured to be −264 MHz (see above), the range of −264±231 MHz(=−495 MHz to −33 MHz) is an important signal band for the IF frequency. When a capacitor is serially inserted to an output from the mixer so as to remove a DC offset, the HPF cutoff frequency can be set to approximately 33 MHz. At this time, the step response time is approximately 30 nanoseconds. Accordingly, it is possible to satisfy the requirement of limiting the step response time to approximately 1/10 of the OFDM symbol time (approximately 30 nanoseconds).

FIG. 8 shows the configuration of a Low-IF multiband OFDM_UWB multiband transmitter according to an embodiment of the present invention.

The Low-IF configuration necessitates generation of an OFDM modulated IF signal. As shown in FIG. 8, the IFFT is performed for a baseband signal as is similarly to the direct conversion. The complex multiplication is performed for the signal and IF frequency exp(-j264 MHz) before the DA conversion. In this manner, the Low-IF configuration can be easily implemented.

The multiband OFDM system using a direct conversion transmitter performs the DA conversion at 1056 Msps to easily eliminate the frequency folding. By contrast, the Low-IF configuration necessitates the DA conversion at 2112 Msps because the IF frequency band ranges from -528 MHz to 0 MHz. To solve this problem, the embodiment performs the DA conversion at 1056 Msps equal to that for the direct conversion transmitter to compensate the frequency response degradation.

Figure 9:
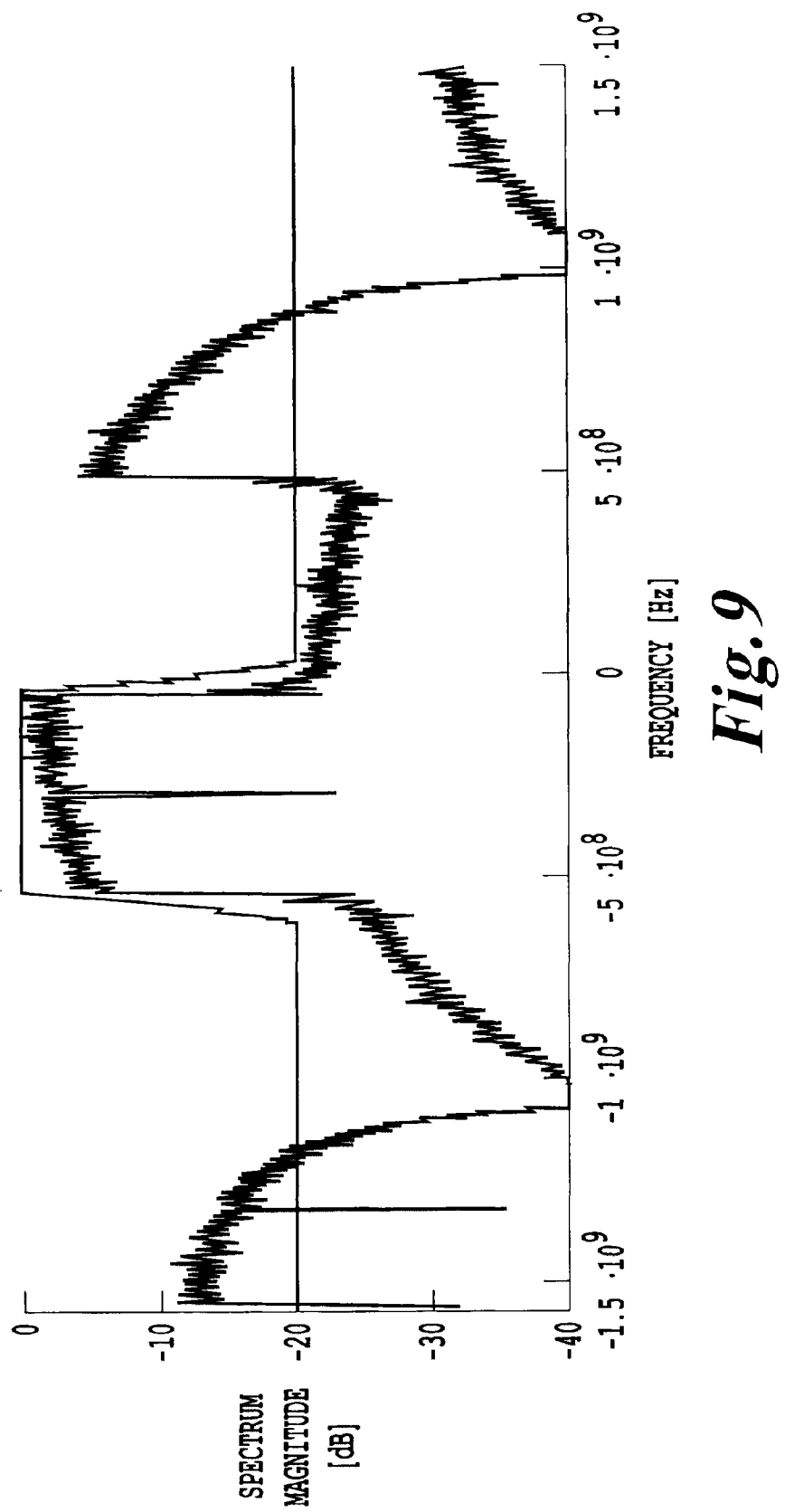
FIG. 9 shows the spectrum of a transmission IF signal when the Low-IF multiband OFDM_UWB multiband transmitter does not correct degradation of the frequency response.

FIG. 9 shows a transmission IF signal spectrum when no correction is made to the frequency response degradation in the Low-IF multiband OFDM_UWB multiband transmitter. The spectrum has the sinc characteristic due to the DA converter's aperture effect. Accordingly, the frequency band between -528 MHz and 0 MHz is not flat but has a gradient of approximately 4 dB. The frequency folding causes relatively large amplitude components in the bands between -1584 MHz and -1056 MHz and between 528 MHz and 1056 MHz.

A sub-carrier power level compensator in FIG. 8 changes the amplitude for each sub-carrier previously to the IFFT In this manner, the frequency response can be easily corrected so as to flatten the gradient of approximately 4 dB. Another correction method is to change a double interpolator (×2 interporatot) to a complex FIR filter. This method can perform the interpolation and the frequency response correction at the same time.

Figure 10:
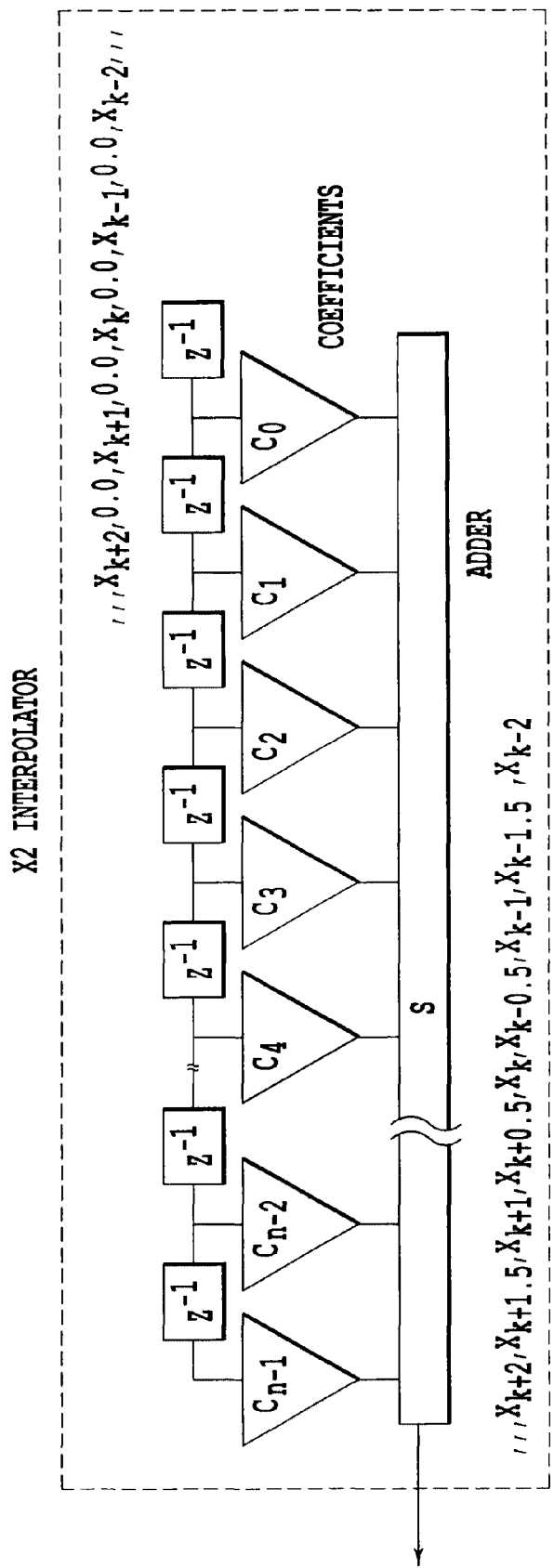
FIG. 10 shows a configuration example of the ×2 interpolator.
Figure 11:
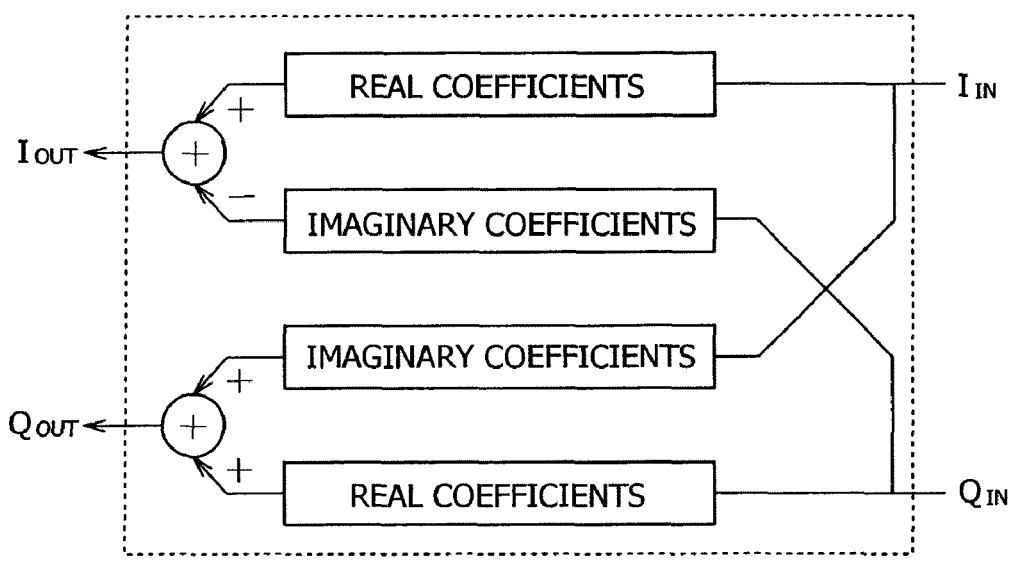
FIG. 11 shows a configuration example of the complex FIR filter.
Figure 12:
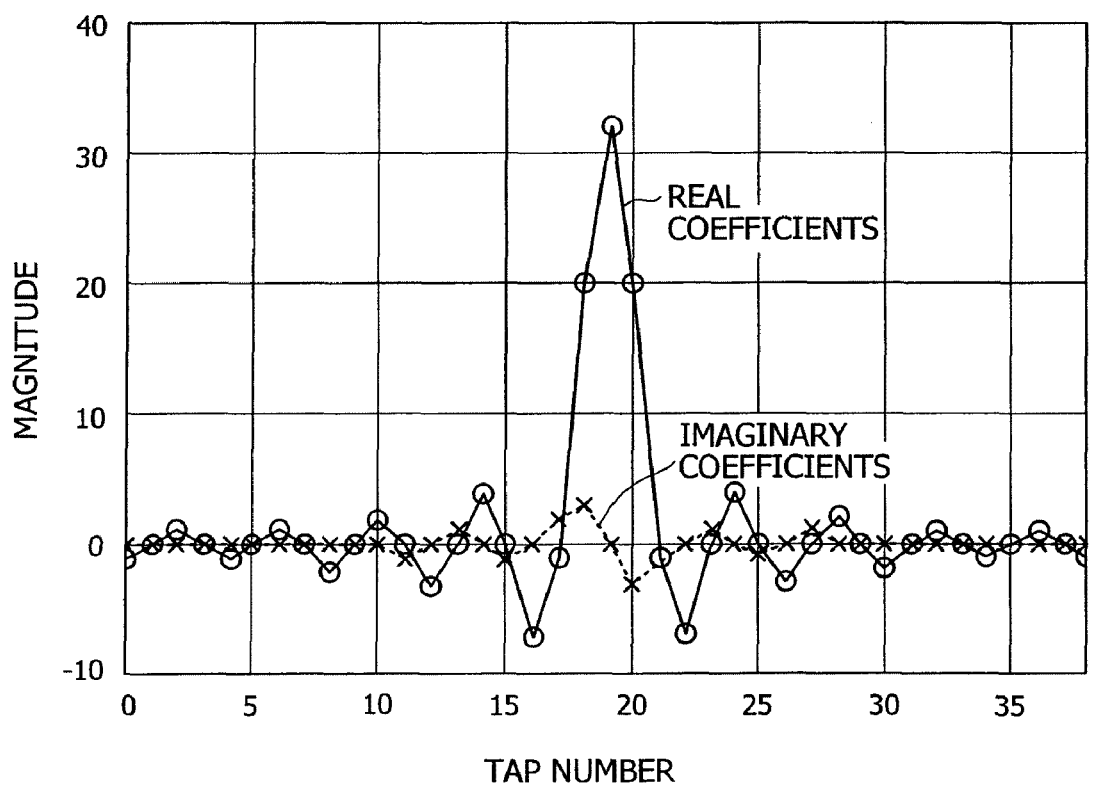
FIG. 12 shows complex tap coefficients of the complex FIR filter as shown in FIG. 11.

As shown in FIG. 10, the ×2 interpolator is composed of FIR filters. These filters are changed to complex FIR filters as shown in FIG. 11. FIG. 12 shows complex tap coefficients for the complex FIR filters.

Figure 13:
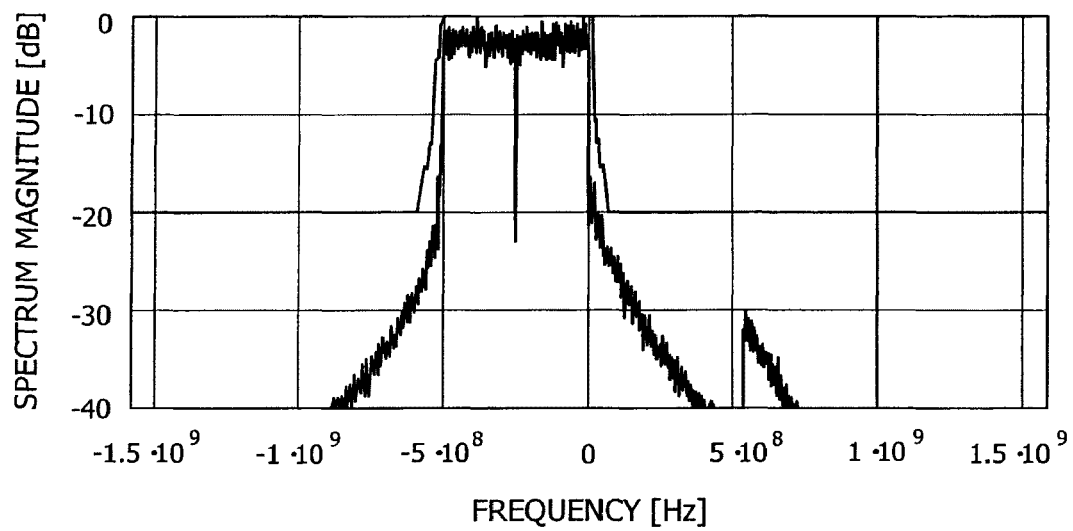
FIG. 13 shows the spectrum of a transmission IF signal when the Low-IF multiband OFDM_UWB multiband transmitter according to the present invention corrects the transmission IF signal's frequency and removes frequency folding components.

A third-order Hilbert BPF can be used to remove frequency folding components. FIG. 13 shows the spectrum of a transmission IF signal when the Low-IF multiband OFDM_UWB multiband transmitter according to the present invention corrects the transmission IF signal's frequency and removes frequency folding components. As seen from FIG. 13, the DA converter's aperture effect is used to correct the frequency response before IFFT. In this manner, a flat frequency spectrum can be obtained.

Figure 14:
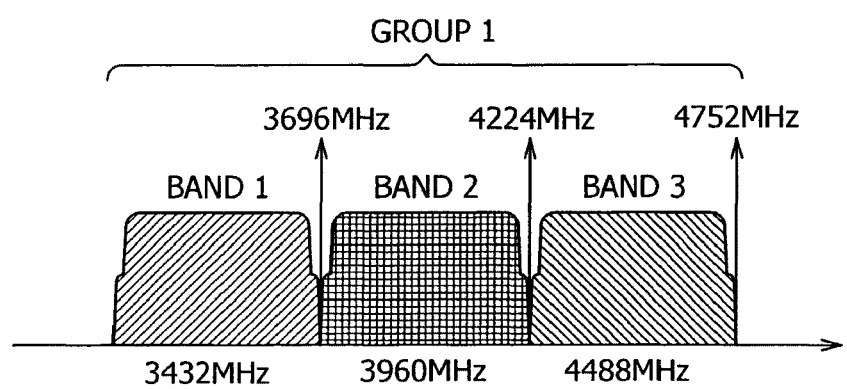
FIG. 14 shows local signals when the Low-IF multiband OFDM_UWB multiband transmitter according to the embodiment uses a group-1 band as shown in FIG. 17.
Figure 15:
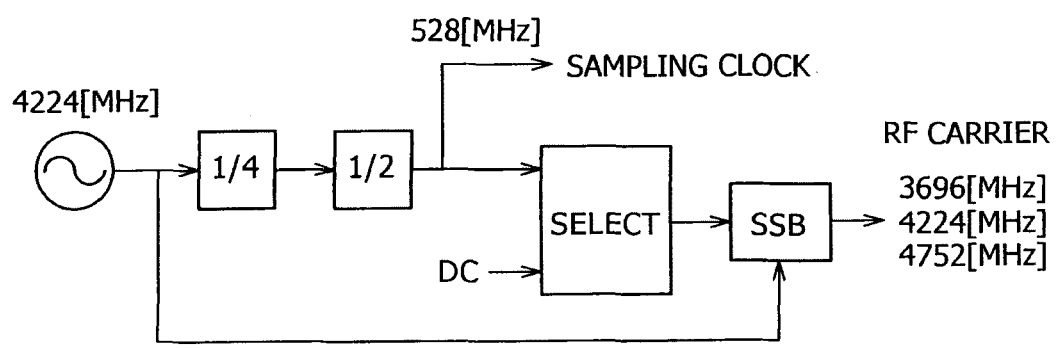
FIG. 15 shows a frequency synthesis block for frequency hopping (FH) used for the frequency configuration as shown in FIG. 14.
Figure 17:
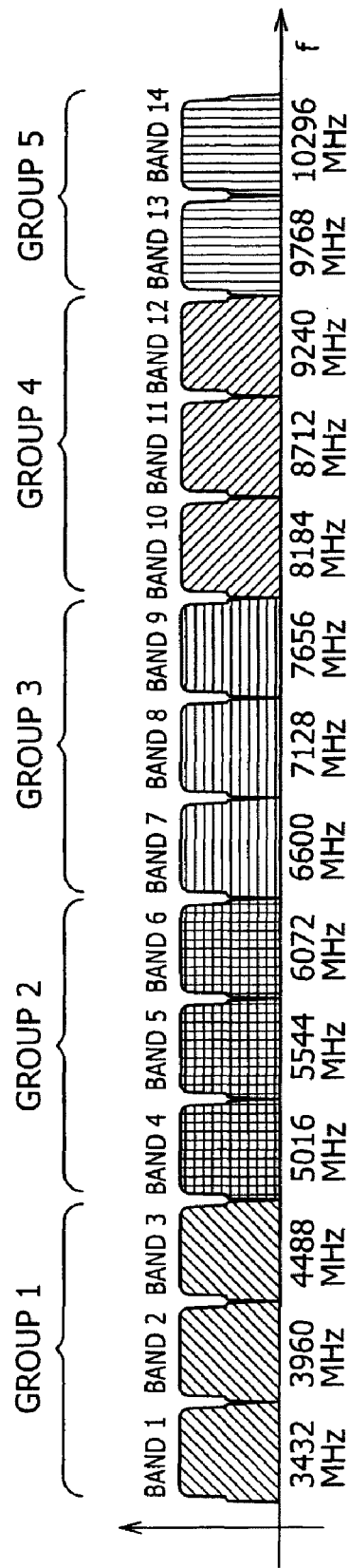
FIG. 17 shows an example of the frequency allocation defined in the multiband OFDM_UWB communication system.
Figure 18:
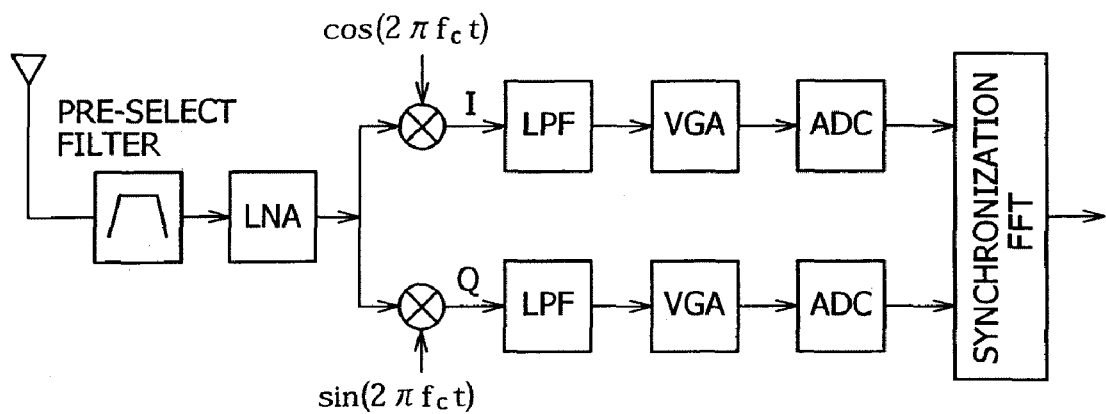
FIG. 18 shows a configuration example of the direct conversion receiver used for the multiband OFDM system.
Figure 19:
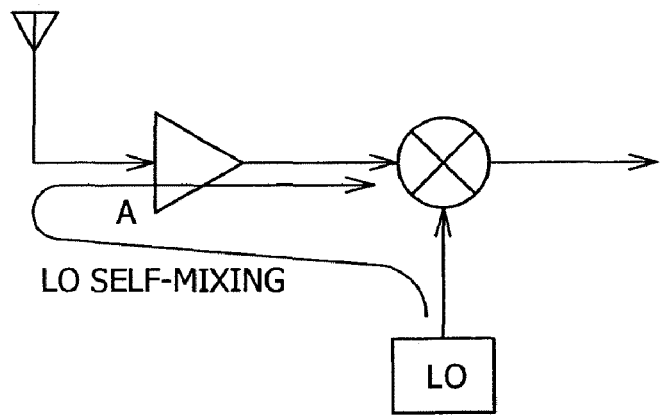
FIG. 19 diagramatically shows self-mixing of a local signal.
Figure 20:
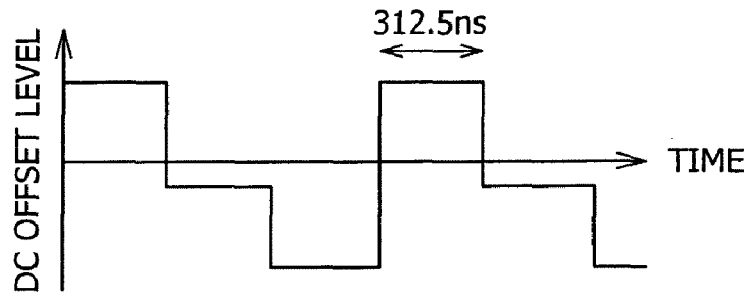
FIG. 20 diagramatically shows a DC offset resulting from the self-mixing.
Figure 21:
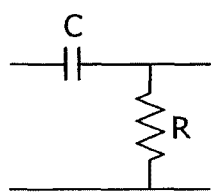
FIG. 21 shows a configuration example of a first-order high-pass filter.
Figure 22:
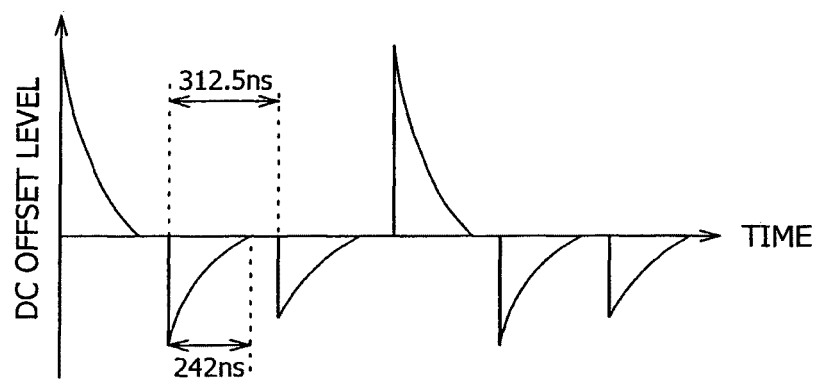
FIG. 22 diagramatically shows the convergence time for the DC offset step response when the high-pass filter cutoff frequency is set to 4.125 MHz in the direct conversion receiver.
Figure 23:
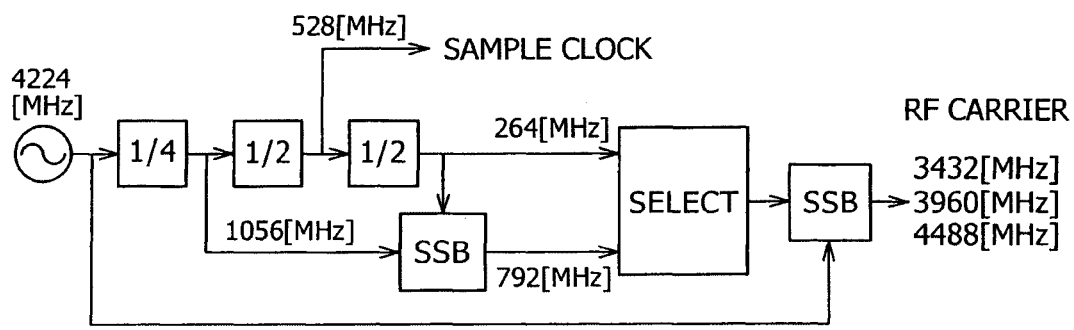
FIG. 23 shows a conventional example of the frequency synthesis block (group-1 3-band mode) for frequency hopping (FH) used for the direct conversion receiver as shown in FIG. 18.
Figure 24:
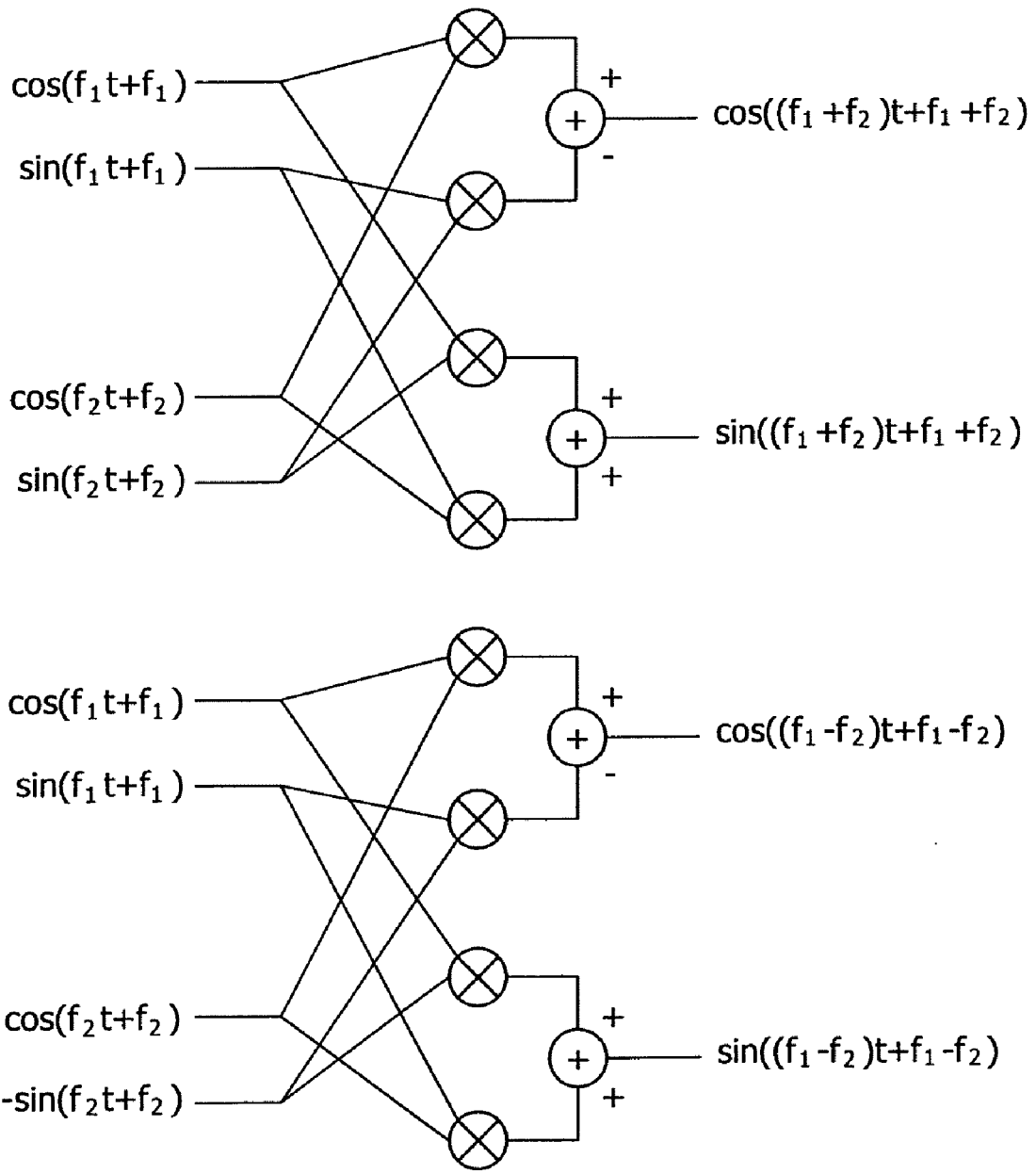
FIG. 24 diagramatically shows image rejection mixer operations.

FIG. 14 shows local signals when the Low-IF multiband OFDM_UWB multiband transmitter according to the embodiment uses a group-1 band as shown in FIG. 17. As shown in FIG. 14, local signal $f_{LO1}$ is 264 MHz higher than the center frequency of each band. FIG. 15 shows a frequency synthesis block for frequency hopping (FH) used for this frequency configuration. As shown in FIG. 15, the frequency synthesis block can divide the reference frequency obtained from a single oscillator (e.g., TCXO (temperature compensated crystal oscillator)) and synthesizes (adds or subtracts) frequencies using a mixer. As will be understood by comparison with FIG. 23, the frequency synthesis block in FIG. 15 decreases the number of dividers and SSB mixers and easily generates local frequencies.

Figure 16:
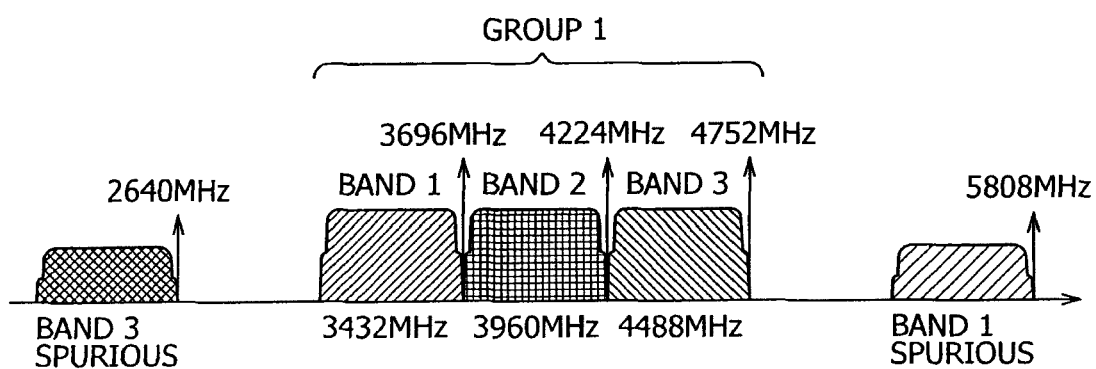
FIG. 16 shows spurious signals resulting from 528 MHz harmonics in the frequency configuration in FIG. 14.

FIG. 16 shows spurious signals resulting from 528 MHz harmonics in this case. As seen from FIG. 16, no spurious signal occurs in group 1. Accordingly, the RF bandpass filter can be used to easily remove spurious signal components.

INDUSTRIAL APPLICABILITY

There has been described in detail the present invention with reference to the specific embodiment. It is to be distinctly understood by those skilled in the art that various changes and modifications and substitutions may be made in the embodiment without departing from the spirit and scope of the present invention. That is, the present invention has been disclosed as exemplification. The contents of this specification should not be interpreted restrictively. The appended claims should be taken into consideration for evaluation of the gist of the present invention.

The invention claimed is:

1. A radio communication apparatus which uses a low-intermediate frequency to transmit a multiband Orthogonal Frequency Division Multiplex (OFDM) signal for hopping a center frequency at a specified band interval, comprising:
    a sub-carrier power level compensator to compensate for an aperture effect of a digital-to-analog conversion by changing amplitudes of respective sub-carriers to provide compensated sub-carriers;
    an OFDM modulator to convert each compensated sub-carrier along a frequency axis into a signal along a time axis by performing a frequency to time domain conversion;
    a low-intermediate frequency multiplier to multiply a low-intermediate frequency and the signal along the time axis together to generate an OFDM-modulated low-intermediate frequency signal, the low-intermediate frequency being half a band interval for frequency hopping;
    a Digital-to-Analog (D/A) converter to convert the OFDM-modulated low-intermediate frequency signal into an analog signal using a specified sampling frequency;
    a frequency up-converter to up-convert the analog signal into a high-frequency transmission signal; and
    an intermediate frequency filter to remove unnecessary frequency components from the analog signal, the intermediate frequency filter including a Hilbert bandpass filter formed by two real filters having a same characteristic and interconnected by a gyrator, a predetermined absolute value being used for a half-band frequency of a ladder-type low-pass filter as a real filter, the predetermined absolute value also being used as a center frequency of said Hilbert bandpass filter, and an integer ratio being used for an element value of a ladder-type prototype filter.

2. The radio communication apparatus according to claim 1, wherein
    the OFDM modulator comprises any of an inverse fast Fourier transform (IFFT), an inverse wavelet transform, and an inverse Hartley transform.

3. The radio communication apparatus according to claim 1, further comprising:
    a complex FIR filter to correct an aperture effect of a digital-to-analog conversion, after the OFDM modulator converts each compensated sub-carrier along the frequency axis into the signal along the time axis.

4. The radio communication apparatus according to claim 1, wherein
    said frequency up-converter is further configured to generate the high-frequency transmission signal by mixing the analog signal with a local signal.

5. The radio communication apparatus according to claim 1, wherein
    said frequency up-converter is further configured to generate the high-frequency transmission signal by mixing the low-intermediate frequency signal with a local signal having a local frequency apart from a transmission frequency by half of the band interval for frequency hopping.

6. A radio communication apparatus which uses a low-intermediate frequency to transmit a multiband Orthogonal Frequency Division Multiplex (OFDM) signal for hopping a center frequency at a specified band interval, comprising:
- a sub-carrier power level compensator to compensate for an aperture effect of a digital-to-analog conversion by changing amplitudes of respective sub-carriers to provide compensated sub-carriers;
- an OFDM modulator to convert each compensated sub-carrier into a signal along a time axis by performing a frequency to time domain conversion;
- a low-intermediate frequency multiplier to multiply a low-intermediate frequency and the signal along the time axis together to generate an OFDM low-intermediate frequency signal, the low-intermediate frequency being half a band interval for frequency hopping;
- a frequency up-converter to up-convert the low-intermediate frequency signal into a high-frequency transmission signal by mixing the low-intermediate frequency signal with a local signal having a local frequency apart from a transmission frequency by half the band interval for frequency hopping; and
- an intermediate frequency filter to remove unnecessary frequency components from the low-intermediate frequency signal, the intermediate frequency filter including a Hilbert bandpass filter formed by two real filters having a same characteristic and interconnected by a gyrator, a predetermined absolute value being used for a half-band frequency of a ladder-type low-pass filter as a real filter, the predetermined absolute value also being used as a center frequency of said Hilbert bandpass filter, and an integer ratio being used for an element value of a ladder-type prototype filter.

7. A radio communication apparatus which uses a low-intermediate frequency to transmit a multiband Orthogonal Frequency Division Multiplex (OFDM) signal for hopping a center frequency at a specified band interval, comprising:
- means for compensating for an aperture effect of a digital-to-analog conversion by changing amplitudes of respective sub-carriers to provide compensated sub-carriers;
- means for converting each compensated sub-carrier along a frequency axis into a signal along a time axis by performing a frequency to time domain conversion;
- means for multiplying a low-intermediate frequency and the signal along the time axis together to generate an OFDM-modulated low-intermediate frequency signal, the low-intermediate frequency being half a band interval for frequency hopping;
- means for Digital-to-Analog (D/A) converting the OFDM-modulated low-intermediate frequency signal into an analog signal using a specified sampling frequency;
- means for up-converting the analog signal into a high-frequency transmission signal; and
- an intermediate frequency filter to remove unnecessary frequency components from the analog signal, the intermediate frequency filter including a Hilbert bandpass filter formed by two real filters having a same characteristic and interconnected by a gyrator, a predetermined absolute value being used for a half-band frequency of a ladder-type low-pass filter as a real filter, the predetermined absolute value also being used as a center frequency of said Hilbert bandpass filter, and an integer ratio being used for an element value of a ladder-type prototype filter.

8. A radio communication method which uses a low-intermediate frequency to transmit a multiband Orthogonal Frequency Division Multiplex (OFDM) signal for hopping a center frequency at a specified band interval, comprising:
- compensating for an aperture effect of a digital-to-analog conversion by changing amplitudes of respective sub-carriers to provide compensated sub-carriers;
- converting each compensated sub-carrier along a frequency axis into a signal along a time axis by performing a frequency to time domain conversion;
- multiplying a low-intermediate frequency and the signal along a time axis together to generate an OFDM-modulated low-intermediate frequency signal, the low-intermediate frequency being half a band interval for frequency hopping;
- converting the OFDM-modulated low-intermediate frequency signal into an analog signal using a specified sampling frequency;
- up-converting the analog signal into a high-frequency transmission signal by mixing the analog signal with a local signal; and
- an intermediate frequency filter to remove unnecessary frequency components from the analog signal, the intermediate frequency filter including a Hilbert bandpass filter formed by two real filters having a same characteristic and interconnected by a gyrator, a predetermined absolute value being used for a half-band frequency of a ladder-type low-pass filter as a real filter, the predetermined absolute value also being used as a center frequency of said Hilbert bandpass filter, and an integer ratio being used for an element value of a ladder-type prototype filter.

* * * * *